United States Patent [19]

Schweiger

[11] 4,242,506

[45] Dec. 30, 1980

[54] CROSS-LINKING OF CELLULOSE SULFATE ESTERS WITH TETRAVALENT METAL IONS

[76] Inventor: Richard G. Schweiger, 1324 Rimrock Dr., San Jose, Calif. 95120

[21] Appl. No.: 54,683

[22] Filed: Jul. 5, 1979

[51] Int. Cl.³ .............................................. C08B 5/14
[52] U.S. Cl. ..................................... 536/59; 106/194; 106/195; 536/33; 536/36; 536/38; 536/41
[58] Field of Search ...................... 536/59, 33, 36, 38, 536/41; 106/194, 195

[56] References Cited

U.S. PATENT DOCUMENTS

| | | | |
|---|---|---|---|
| 3,068,063 | 12/1962 | Kiefer et al. | 106/194 |
| 3,125,458 | 3/1964 | Dalton | 106/195 |
| 3,520,960 | 7/1970 | Douglas | 106/195 |
| 3,793,043 | 2/1974 | Dresie et al. | 106/194 |
| 3,804,174 | 4/1974 | Chatterji et al. | 106/194 |
| 3,816,150 | 6/1974 | Ishii et al. | 106/194 |
| 4,138,535 | 2/1979 | Schweiger | 260/17 R |
| 4,141,746 | 2/1979 | Schweiger | 536/59 |

*Primary Examiner*—Ronald W. Griffin

*Attorney, Agent, or Firm*—Smyth, Pavitt, Siegemund, Jones & Martella

[57] ABSTRACT

Cellulose sulfate esters are cross-linked with tetravalent metal ions at a threshold pH of about 3.0 or higher. The cross-linked products have a higher aqueous viscosity and are more highly pseudoplastic than the precursor cellulose sulfate and may also exhibit a relatively high yield point. The products may be employed in forming thickened aqueous compositions and cohesive gel-like compositions.

The presence of other metallic ions, in addition to the tetravalent metal ions, is beneficial and enhances the viscosity increase produced by cross-linking of the cellulose sulfate with the tetravalent metal ions.

The invention is directed to a process for cross-linking of cellulose sulfate esters with tetravalent metal ions, to mixtures of cellulose sulfate esters and tetravalent metal ions that may be used in producing cross-linking of the cellulose sulfate, to a cellulose sulfate product which is cross-linked with tetravalent metal ions, and to aqueous compositions containing cellulose sulfate cross-linked with tetravalent metal ions.

28 Claims, No Drawings

CROSS-LINKING OF CELLULOSE SULFATE ESTERS WITH TETRAVALENT METAL IONS

BACKGROUND OF THE INVENTION

Cellulose sulfate esters are known materials which may be used as thickening agents in an aqueous medium. Preferred cellulose sulfate esters, as disclosed in my U.S. Pat. No. 4,138,535, and in the Reissue Application therefore, Ser. No. 033,455 filed Apr. 26, 1979, may be formed by sulfating a cellulose nitrite intermediate. Such cellulose sulfate esters have a generally more uniform distribution of sulfate ester groups among the polymer units of the cellulose. Accordingly, these cellulose sulfate esters have physical properties which are generally superior to cellulose sulfate esters prepared by other procedures.

As disclosed in my prior U.S. Pat. No. 4,138,535, it is advantageous in forming a cellulose nitrite ester that the cellulose reactant be in an activated state. Activation of the cellulose may be accomplished by treating the cellulose with water such that the cellulose contains about 4 to about 12 percent by weight of water uniformly distributed throughout the cellulose. An alternative way of preparing the activated cellulose is to treat cellulose containing about 4 percent by weight or more of water uniformly distributed throughout the cellulose with a highly polar aprotic solvent so as to reduce the water content of the cellulose. The temperature of such treatment is not critical. However, it should be kept in mind that enough time should be provided for the exchange of the water and the highly polar aprotic solvent and that the time required for the exchange is increased as the temperature is reduced. When formed in this manner, the activated cellulose may contain less than about 4 percent by weight of water. It is also desirable that the cellulose reactant be contacted with an aprotic solvent, such as dimethylformamide, prior to contact of the cellulose with the nitrosating reagent to reduce degradation of the cellulose and undesired side reactions.

When activated cellulose, as described, is nitrosated through treatment with dinitrogen tetroxide or nitrosyl chloride, as described in my U.S. Pat. No. 4,138,535, the resulting cellulose nitrite esters are more uniform than is the case when the cellulose nitrite esters are prepared by nitrosating dried cellulose. On sulfation of the cellulose nitrite esters prepared from activated cellulose, as described, the more uniform distribution of nitrite ester groups in the cellulose nitrite intermediate produces an even greater uniformity of sulfate ester distribution in the resulting cellulose sulfate ester product.

In the use of cellulose sulfate esters in forming thickened aqueous compositions, it would be desirable if the properties of the aqueous composition could be further enhanced by cross-linking the cellulose sulfate esters. This would, for example, permit the use of lower molecular weight cellulose sulfate esters to produce a viscosity as high as, or higher than, that of high molecular weight cellulose sulfate ester. Also, if the cellulose sulfate ester could be cross-linked so as to improve the viscosity characteristics of aqueous compositions containing the cellulose sulfate ester, this would permit economies in the usage of cellulose sulfate esters. For example, by cross-linking the cellulose sulfate ester with a less expensive chemical, thickened aqueous compositions could be obtained which contain a smaller quantity of the cellulose sulfate ester than that previously required to produce the same viscosity.

Also, if cellulose sulfate esters could be cross-linked, this would permit the use of cellulose sulfate esters in the formation of cohesive, gel-like compositions. In this manner, for example, cellulose sulfate esters could be used for new applications in producing gelled products, such as gelled explosives, gelled cleaning compositions, gelled cosmetics, and the like. By providing aqueous compositions that are highly pseudoplastic and have a high yield point, cross-linked cellulose sulfate esters could then be employed in use applications in which product homogeneity is provided by a matrix structure such that suspended solids, for example, do not settle out but remain uniformly distributed throughout the gel.

SUMMARY OF THE INVENTION

In accord with the present invention, I have discovered a procedure for cross-linking cellulose sulfate esters through treatment of the esters with a tetravalent metal ion, such as a ceric, zirconic, or titanic ion. The cross-linking may be readily carried out in an aqueous medium by, for example, adding an aqueous solution containing a substantially water-soluble salt of the tetravalent metal ion to cellulose sulfate. Following this, the pH of the aqueous medium may be raised to a threshold level, which is generally in the order of 3.0 or higher. At this point, cross-linkage of the cellulose sulfate ester occurs. The amount of the salt of the tetravalent metal ion that is employed may vary depending on the properties desired in the cross-linked cellulose sulfate product. For example, the tetravalent metal salt may be present in an effective amount varying from about 1 to about 30 percent and preferably about 4 to about 20 percent by weight of the cellulose sulfate. When the cellulose sulfate reactant has a lower degree of polymerization (D.P.), a larger quantity of the tetravalent metal salt may be used to obtain a cross-linked product having the desired viscosity characteristics from the lower viscosity, lower D.P. cellulose sulfate reactant.

The threshold pH required to produce cross-linkage of the cellulose sulfate may be determined for a particular cellulose sulfate and a particular tetravalent metal salt by means of a simple test. According to the test, a 0.5 percent by weight solution of the cellulose sulfate salt is formed in deionized water containing 5% sodium chloride and to the solution is added the tetravalent metal salt in an amount equal to 10 percent by weight of the cellulose sulfate salt with the pH maintained below about 2.0. At this point, the viscosity of the solution is measured at 20° C. and the pH is gradually increased by adding a 5 percent solution of ammonium hydroxide with stirring. As the pH is increased, the viscosity of the solution is measured at various pH values. At the point where cross-linking of the cellulose sulfate occurs, a very small increase in pH produces a very large increase in viscosity. With the viscosity of the solution plotted vertically and the pH of the solution plotted horizontally, the slope of the viscosity-pH curve increases sharply when cross-linking of the cellulose sulfate occurs with the curve leveling off after cross-linking has been completed. The threshold pH where cross-linkage of the cellulose sulfate occurs is defined as the mid point of the straight line portion of the viscosity-pH curve where the slope of the curve increases sharply.

If the cellulose sulfate is a lower viscosity material, a 1.0 percent by weight solution may be used for the above described test instead of a 0.5 percent solution. By using a higher concentration, the rate of change of the viscosity during cross-linkage will be more noticeable, such that the threshold pH value may be more readily determined.

The resulting cross-linked sulfate ester may then be dried and sold as a cross-linked ester product. Upon addition of the cross-linked ester product in an effective amount such as about 0.05 to about 10 percent by weight to an aqueous medium by the user, thickening of the aqueous medium takes place. At increased concentration levels of the cross-linked cellulose sulfate ester and/or the tetravalent metal ion, aqueous gels may be formed. Aqueous products which contain the cross-linked sulfate ester are highly psuedoplastic. Additionally, such aqueous compositions may tolerate relatively high quantities of other salts without precipitation or significant loss of viscosity. In fact, it has been found that the presence of other salts, in addition to the presence of the cross-linking tetravalent metal ions, may produce a coaction between the additional salt and the tetravalent metal ion which enhances the aqueous viscosity characteristics provided by the cross-linked cellulose sulfate ester.

The molecular weight of the cellulose sulfate is not critical to the invention. Thus, for example, the cellulose sulfate may be degraded and have a low average molecular weight of about 200 or less. Conversely, the cellulose sulfate may have a high average molecular weight of about 7,000 when the cellulose sulfate is obtained from a source such as cotton linters. In general, it is preferable that the molecular weight of the cellulose be high because a greater effect is obtained from cross-linking the higher molecular weight materials with a tetravalent metal ion.

The present invention provides a method for cross-linking cellulose ester products. Additionally, the invention provides mixtures of cellulose sulfate esters with tetravalent metal ions which may be utilized in producing cross-linkage of the cellulose sulfate esters. Further, the invention provides cross-linked cellulose sulfate esters which may be sold and transported as dry materials and then simply added to an aqueous medium to produce either a thickened aqueous product or, at higher concentrations, an aqueous gel.

The present invention also provides aqueous compositions which contain a cellulose sulfate ester cross-linked with tetravalent metal ions in an effective amount to provide thickening of the aqueous medium as well as aqueous gel that contain cellulose sulfate estes cross-linked with tetravalent ions in an amount sufficient to produce gelation.

As applied to various specific products, the invention encompasses the use of buffering agents in aqueous compositions containing a cellulose sulfate ester cross-linked with a tetravalent metal ion. Since the viscosity effect provided by the cross-linked cellulose sulfate ester may vary depending upon the pH of the medium, the presence of a buffering agent maintains the pH at a desired level such that the viscosity characteristics of the medium do not change over an extended time period.

DETAILED DESCRIPTION

As previously stated, a perferred form of cellulose sulfate for use in the present invention is prepared from a cellulose nitrite intermediate. In forming a cellulose nitrite intermediate, cellulose suspended in a suitable solvent is nitrosated with dinitrogen tetroxide, nitrosyl chloride, or mixtures thereof to obtain a cellulose nitrite ester. The solvent must contain a swelling or solubilizing solvent for the nitrite esters and a proton acceptor. Suitable swelling or solubilizing solvents are organic esters, ethers, aromatic and aliphatic hydrocarbons, and the like, and suitable proton acceptors are N,N-dialkylacylamides and weak tertiary amines, such as pyridine, quinoline, isoquinoline, and the like. The proton acceptor, however, may function as both swelling or solubilizing solvent and proton acceptor, in which case only one solvent is applied. The nitrosating compound used in the reaction mixture may be present in a molar ratio of anhydroglucose unit to dinitrogen tetroxide or nitrosyl chloride of about 1:0.1 to 1:3 to provide a degree of substitution (D.S.) of 0.1 to 3. The reaction is quantitative and, thus, the D.S. approximately coincides with the molar amount of nitrosating agent that is used. If nitrosyl chloride is used in combination with dimethylformamide (DMF) or dimethylacetamide (DMAC), a 2.5- to 3.0-fold excess of the nitrosating agent is required to attain these D.S.'s. In other words, one mole of dinitrogen tetroxide or nitrosyl chloride is required to replace one mole of hydroxyl racical of the cellulose, and, if nitrosyl chloride is used with an N,N-dialkylacylamide as the proton acceptor, 2.5 to 3.0 moles of nitrosyl chloride are required.

The maximum attainable D.S. for cellulose is about 3; thus, the molar amount of dinitrogen tetroxide necessary to attain complete esterification is about 3 moles per mole of anhydrohexose unit. The same molar ratio amount of nitrosyl chloride is necessary for complete esterification unless DMF or DMAC is used as the solvent, in which case the amount has to be approximately tripled. An excess amount of the nitrosating compound, beyond that necessary for complete esterification, may be added with the only effect being an increased rate of esterification.

The nitrosation reaction is preferably carried out with constant agitation of the reaction mixture, and it is necessary that the nitrosating compound be introduced into the cellulose suspension under the exclusion of moisture. It is preferable to cool the reaction vessel in an ice bath or the like since the reaction is moderately exothermic, and it is desirable to maintain the temperature of the reaction mixture below 50° C. If maximum esterification is desired, completeness of the reaction is indicated by the formation of a clear solution or paste, while partial esterification is indicated by a swelling and/or partial dissolving of the product in the reaction mixture.

Cellulose nitrite esters are relatively sensitive materials and decompose immediately upon the addition of a protic solvent, such as water, methanol, ethanol, isopropanol, or the like, in the presence of a mineral acid catalyst. This results in the regeneration of the undegraded cellulose starting material.

As described previously, it is preferably that the cellulose reactant be activated since this permits the nitrosation to be carried out in a shorter period of time with the use of essentially stoichiometric amounts of the nitrosation reactant. This produces a more homogeneous reaction mixture, a higher clarity product, and permits easier separation of the production from the reaction mixture, while reducing the need for filtration.

In activating the cellulose reactant, the cellulose may be treated with water so as to contain from about 4 to about 12 percent by weight of water with the water being substantially uniformly distributed throughout the cellulose reactant. Also, the activated cellulose may contain less than 4 percent by weight of water than the activated cellulose is prepared by treating activated cellulose with a highly polar aprotic solvent. The cellulose initially may contain in excess of about 4 percent by weight of water distributed substantially uniformly throughout the cellulose. With contacting and/or washing of the cellulose with a highly polar aprotic solvent over a sufficient period of time to reduce the water content of the cellulose to less than about 4 percent by weight, it has been found that the cellulose remains in an activated state, even though the washed cellulose has a water content of less than about 4 percent by weight. The treated cellulose may then be employed in the manner described for nitrosation of the cellulose with dinitrogen tetroxide or with nitrosyl chloride.

The cellulose nitrile esters which are utilized as intermediates in the preparation of the cellulose sulfate ester need not be isolated from the reaction mixture in order to carry out the subsequent sulfation reaction. If desired, however, the cellulose nitrite esters may be isolated by neutralizing the reaction mixture through addition of a base, such as mono-, di-, and trialkylamines, pyridine, alkali, or alkaline earth metal hydroxides, carbonates, bicarbonates, or the like. The addition of such a base is necessary only if an N,N-dialkylacylmide has been used as the proton acceptor since, during nitrosation with dinitrogen tetroxide or nitrosyl chloride, an equimolar amount of nitric acid or hydrochloric acid is formed. If a weak tertiary amine base, such as pyridine or quinoline, is used as the proton acceptor, the addition of a base is unnecessary since, in this case, the acid that is formed is neutralized by the tertiary amine base and cannot serve as a catalyst for the decomposition of the cellulose nitrite.

The neutralized, or preferably slightly alkaline, solution may then be added to ice-cold water with stirring to separate the cellulose nitrite ester as a fibrous material which may be easily removed. Those products having a D.S. considerably below the maximum may be swellable or even soluble in water, in which case an alcohol may be used in place of the water.

Cellulose nitrite esters are relatively unstable. For storage purposes, it is preferred that a cellulose nitrite ester be dissolved in a suitable solvent, such as benzene, toluene, ethyl acetate, ethylene dichloride, ether, DMF, DMAC, or the like, and stored at a low temperature, preferably below 10° C. Suitable solvents generally are also suitable as swelling or solubilizing solvents in the nitrosation reaction.

In forming a cellulose sulfate ester, the solution of the cellulose nitrite ester is sulfated, preferably with a sulfur trioxide-solvent complex, at a low temperature, to obtain a polymeric mixed nitrite:sulfuric acid ester.

The cellulose nitrite ester solution preferably comprises the nitrosation reaction mixture, as described, in which an N,N-dialkylacylmaide has been used as the proton acceptor. The temperature of the reaction mixture, during sulfation, should preferably be maintained in the range from about 0° to about 25° C., and more preferably, 5° to 15° C. to prevent depolymerization of the molecule during sulfation. A preferred sulfating agent is sulfur trioxide which may be added to the reaction mixture in either its liquid or its gaseous form or as a solution in an inert solvent such as carbon tetrachloride. Since the addition of sulfur trioxide is very exothermic, and a low reaction temperature is critical to obtaining the desired viscosity of the cellulose sulfate product, the sulfur trioxide must be added slowly with stirring, while maintaining the reaction mixture in a cooling medium, such as an ice bath.

It is preferable that the sulfating agent be first added to a solvent, preferably the same solvent as that contained in the reaction mixture so as to facilitate solvent recovery, to form a complex which, upon addition to the reaction mixture, produces a less exothermic reaction. Examples of solvents which are capable of forming a complex with sulfur trioxide are DMF, DMAC, dioxane, and pyridine. In general, the molar ratio of the sulfur trioxide to solvent in the sulfation complex is 1:1. However, it is preferable to use an excess of the solvent so as to obtain a suspension or solution of the complex in the excess solvent. The sulfation complex is slowly added to the reaction mixture with agitation and exclusion of moisture. The amount of sulfating agent that is added to the mixture is dependent upon the D.S. that is desired in the resulting cellulose sulfate ester. A low D.S. ranging from 0.1 to 1.0 requires about 0.1 to about 1.0 mole of sulfur trioxide per mole of anhydrous glucose unit. A D.S. value ranging from about 1.0 to about 2.0 requires about 1.0 to 4.0 moles of sulfur trioxide per anhydrous glucose unit. A D.S. which exceeds 2.0 is difficult to obtain under the reaction conditions, and a large excess of sulfur trioxide is required.

Upon addition of the sulfating agent to the cellulose nitrite ester reaction mixture, there is formed a mixed cellulose nitrite:sulfuric acid ester. Although a cellulose nitrite ester having a maximum D.S. may be used for the sulfation to obtain products with a degree of sulfation of up to about 1.1, it is preferred that the cellulose nitrite intermediate have a lower D.S. for economic reasons, and particularly for a sulfate with a D.S. of above about 1.1. For example, cellulose can be readily sulfated to a D.S. of between about 1 and 2 only when the degree of nitrosation is between about 2 and 1. However, if the degree of nitrosation drops considerably below about 1, the sulfation becomes increasingly more difficult and incomplete, and the distribution of the sulfate groups becomes more non uniform. In general, the higher the degree of sulfation that is desired, the lower is the degree of nitrosation of the cellulose nitrite intermediate with the result that the mixed cellulose nitrite:sulfuric acid ester has a maximum D.S. In other words, the sum of the degree of nitrosation and the degree of sulfation should be about 3.

Following the formation of the mixed nitrite:sulfuric acid ester, the mixed ester is then reacted with a protic solvent to obtain the corresponding cellulose sulfuric acid ester. On the addition of a protic solvent, such as water, methanol, or ethanol, a pure cellulose sulfuric acid ester is produced. This result occurs because the protic solvent replaces the nitrite groups of the mixed ester with hydroxyl groups, with the protic solvent being added in either stoichiometric amount or in excess thereof.

As described above, the nitrosation reaction is carried out in the presence of a swelling or solubilizing solvent for the nitrite esters and a proton acceptor. Although it is generally preferred to use only one solvent which is suitable as both swelling or solubilizing solvent and proton acceptor, it may be desirable to use the combination of two or more solvents in certain process modifications. For example, the cellulose sulfuric acid ester may be first isolated in its free acid form by carrying out the nitrosation reaction in the presence of the appropriate type and amount of swelling or solubilizing solvent for the nitrite ester to result in precipitation of the cellulose sulfuric acid ester at an intermediate process stage. The substantially pure cellulose sulfuric acid ester is then removed and neutralized with a base to form a salt thereof. Or, an appropriate solvent may be added later, after the cellulose sulfuric acid ester is formed, to precipitate the substantially pure free acid form for subsequent neutralization.

To isolate the cellulose sulfate ester, 2 to 4 volumes of a water-miscible solvent, such as acetone, may be added to the mixture to separate off the cellulose sulfate ester. The ester may then be removed and washed with fresh solvent and re-dissolved in ice water. Following this, the sulfuric acid ester may be neutralized with a base to form a cellulose sulfate salt. The cellulose sulfuric acid ester will degrade upon storage, and it is, therefore, preferable that it be converted to a salt. The preferred bases for neutralizing the ester are the hydroxides, carbonates, and bicarbonates of the alkali and alkaline earth metals; also, ammonium hydroxide and the amines may be used for this purpose. The resulting cellulose sulfate salt may then be isolated by adding the neutralized mixture, with agitation, to a water-miscible solvent such as acetone, methanol, ethanol, or isopropanol, and dried, or the paste may be dried directly to result in the dry product.

If desired, the cellulose sulfuric acid esterprotic solvent reaction mixture, as described, may be neutralized directly to form the cellulose sulfate ester salt. This is the preferred method when only one solvent is used in carrying out the reaction. The base may be added to the mixture as an aqueous solution, as a suspension, or in its dry form. In the resulting neutralized mixture, the cellulose sulfate ester product may be present in a wet, but solid, form and may be removed directly by centrifugation or filtration, pressed out, and dried to provide a technical grade material which contains salt impurities. A pure grade of cellulose sulfate ester salt may be obtained by washing the wet product one or more times with aqueous alcohol prior to drying. If there is a relatively large amount of water in the neutralized mixture, the cellulose sulfate ester salt may be too soft, to be removed, or may even be partially dissolved. In this situation, enough alcohol may be added to harden the product somewhat or to precipitate it so that it can then be filtered off or centrifuged.

Thus, the cellulose sulfate ester obtained by the above precedure is water-soluble. Also, since the cellulose does not undergo depolymerization during formation of the cellulose sulfate ester, a 1 percent aqueous solution of the cellulose sulfate salt produces a very viscous and stable solution. Sodium cellulose sulfate esters produced by the above procedure are water-soluble if the D.S. exceeds about 0.3 and have viscosity measurements of as high as 8,000–9,000 cps at a concentration of about 1 percent by weight.

Whatever specific process is used for forming the cellulose sulfate esters, the cellulose sulfate products obtained are generally suitable for purposes of the present invention for cross-linkage with tetravelent ions.

Solutions of cellulose sulfate salts prepared from cellulose nitrile intermediates, as described above, are also pseudoplastic and tolerate high quantities of salt without precipitation or significant loss of viscosity.

In forming cross-linked cellulose sulfate ester products in accord with the present invention, a solution of the cellulose sulfate ester is admixed with a solution of a tetravalent metal salt with the tetravalent metal ions reacting with the cellulose sulfate. The cross-linking reaction is conducted at a threshold pH that may vary depending upon the cellulose sulfate reactant and the particular tetravalent metal ion which is employed. In general, however, the threshold pH is in the order of about 4. As a result of the cross-linking reaction, the viscosity of the solution is increased and the solution becomes more highly pseudoplastic and may exhibit a relatively high yield point. The increase in the viscosity, pseudoplasticity, and yield point are dependent upon the concentration of the tetravalent ion and become greater as the concentration of tetravalent ion is increased. At a relatively high concentration of tetravalent metal ion, gels are formed. Similarly, as the concentration of tetravalent metal is increased, the gel strength is likewise increased. Additionally, of course, the viscosity and gel strength are also increased when the concentration of cellulose sulfate is increased. The threshold pH at which cross-linkage occures may vary such that the threshold pH may range between a pH of about 3 and about 7. Additionally, the threshold pH may be influenced by the presence of other ingredients which are present in the reaction mixture, such as other salts, and the concentration of the salts other than the salt of the tetravalent metal ion.

In cross-linking the cellulose sulfate, a solution of the cellulose sulfate may first be prepared. The concentration of cellulose sulfate in the solution may, for example, be as low as 0.1 percent or less, so long as a viscosity increase occurs as a result of the presence of the cellulose sulfate in the solution. Also, the concentration of the cellulose sulfate in the solution may be as high as about several percent, as long as mixing is still possible. The D.S. of the cellulose sulfate may range from about 0.3 to about 2.0. In general, when the D.S. of the cellulose sulfate is in excess of 2.0, reaction between the cellulose sulfate and the tetravalent metal ion causes precipitation of the cellulose sulfate, which is undesirable.

To a solution containing the cellulose sulfate, there may be added a water-soluble salt of a tetravalent metal ion, preferably in the form of an aqueous solution. The tetravalent metal ion is added with agitation so as to facilitate contact between the cellulose sulfate and the tetravalent metal ion. Examples of tetravalent metal ions are the $Zr^{4+}$, $Ce^{4+}$, and the $Ti^{4+}$ ions. As stated, these ions are added in the form of a water-soluble salt such as a chloride, oxychloride, sulfate, or nitrate salt. Additionally, complex metal salts may be used which may contain other metals in addition to the tetravalent metal. Examples of such complex salts are ceric ammonium nitrate or aluminum zirconium pentachloride. The quantity of the tetravalent metal salt which is added is sufficient to increase the viscosity of the cellulose sulfate solution, while not being present in an amount which would cause separation of the cellulose sulfate from solution. The amount of tetravalent metal salt, thus, may vary between about 1 and about 30 percent by weight of the cellulose sulfate in solution. However, as stated, the amount of tetravalent metal salts may be less than 1 percent so long as the tetravalent metal salt produces a viscosity increase through cross-linkage with the cellulose sulfate or more than 30 percent so long as this quantity of tetravalent metal salt does not cause separation of the cellulose sulfate.

When the solutions of the cellulose sulfate and the tetravalent metal salt are mixed, the pH should be below the threshold pH value that produces reaction of the tetravalent metal ions with the cellulose sulfate to cause crosslinkage. In general, the threshold pH may vary, as stated, within the pH range of about 3.0 to about 7.5. However, in general, the threshold pH is within the range of about 3.5 to about 5.5. The threshold pH value has been found to depend, to some extent, on the particular tetravalent ion that is used. Thus, for example, it appears that the $Ti^{4+}$ ion causes cross-linkage of the cellulose sulfate at a lower pH than that required by the $Zr^{4+}$ ion. Also, it appears that the $Ce^{4+}$ ion requires a higher pH for cross-linkage than either the $Zr^{4+}$ or the $Ti^{4+}$ ions. If desired, a mixture of tetravalent metal ions may be present to produce cross-linkage. This may be beneficial since, as the pH is raised, the $Ti^{4+}$ ion may first react with the cellulose sulfate while the $Zr^{4+}$ ion may then react at a somewhat higher pH and the $Ce^{4+}$ ion may react at a still higher pH. To cross-link the cellulose sulfate and to obtain the desired rheological changes, the pH of the combined cellulose sulfate-tetravalent metal salt solution is raised to a pH above the threshold value that is required for cross-linking of the cellulose sulfate. As stated, in the case of the $Ti^{4+}$ ion, the threshold pH may be about 4 to about 5 or even lower. In raising the pH, a base may be added, such as ammonium hydroxide, the hydroxides or carbonates of the alkali or alkaline earth metals such as potassium hydroxide, sodium carbonate, calcium carbonate, magnesium hydroxide, and the like, and the primary, secondary, and tertiary or quaternary amines.

In addition to the foregoing enumerated bases, any base may be utilized for increasing the pH so long as the basic material is compatible, i.e., non-reactive, with the cellulose sulfate and the tetravalent metal salt. In the pH adjustment, as described, the mixture is well agitated to provide contact between the tetravalent metal ions and the cellulose sulfate and to prevent excessive local cross-linking reactions, particularly when it is desired to obtain the formation of a gel. In the production of a gel, a particularly desirable way of increasing the pH is to add a material which dissolves very slowly such that the pH is raised slowly as the material is dissolved. Through use of this procedure, sufficient time is provided for complete dispersion before increase of the pH level to a level that is high enough to cause cross-linkage and gelation of the cellulose sulfate.

As stated, other salts may be present in addition to the soluble salts of the tetravalent metal ions. The presence of mono-, di-, and trivalent metal salts which are compatible with cellulose sulfate, i.e., non-reactive with cellulose sulfate, does not inhibit cross-linkage of the cellulose sulfate and has no adverse effect even when the solution is saturated with the other such salts. In fact, the presence of additional salts, such as, for example, sodium chloride, potassium chloride, calcium chloride, magnesium chloride, or ammonium nitrate in a relatively high amount exceeding, for example, about 1-2 percent, has been found to be advantageous. This is particularly the case when the $Zr^{4+}$ ion is used for producing cross-linking of the cellulose sulfate. The presence of these salts, in addition to the tetravalent metal salt, appears to produce a smoother cross-linking reaction, such that the reaction mixture is easier to handle both before and during the cross-linking reaction with any tendency toward partial separation of the cellulose sulfate reactant during the reaction being greatly reduced. After cross-linking of the cellulose sulfate in this manner, the reaction mixture may be dried to produce a dry product containing the cross-linked cellulose sulfate. When the dry product is added to water with agitation, a viscous, pseudoplastic aqueous medium is maintained. As the concentration of the dried product in water is increased, a cohesive gel-like structure may be formed. Before drying of the cross-linked cellulose sulfate, the cross-linked material may be separated by adding a lower alcohol, such as methanol or ethanol, to reduce the solubility of the cross-linked material.

An alternative means of preparing the cross-linked cellulose sulfate is to spray, for example, a solution of the salt of the tetravalent metal ion onto dry cellulose sulfate. If desired, the aqueous solution of the tetravalent metal salt may contain a water-miscible lower alcohol to inhibit the solubility of the cellulose sulfate and the formation of a paste with the water in the tetravalent salt solution. After this, a solution of a base, such as an alcoholic solution of ammonium hydroxide, may be sprayed onto the cellulose sulfate with the material then being dried. On the addition of the dried product to water, the presence of the cross-linked cellulose sulfate produces the desired rheological changes to increase the viscosity and the pseudoplasticity of the aqueous medium. Since cross-linking of the cellulose sulfate will not occur uniformly throughout the cellulose sulfate when the solution of tetravalent metal salt is sprayed onto the cellulose sulfate, additional cross-linkage may occur after the product is added to water. Additionally, of course, if further pH control is desired, the pH may be further adjusted after addition of the product to water to promote further cross-linkage of the cellulose sulfate.

As another alternative, a dry blend may be formed by mixing a dry cellulose sulfate with a dry water-soluble salt of the tetravalent ion. The dry powders may be combined at the ratios required for providing the desired rheological properties in an aqueous medium at a particular pH. The powder blend may then be sold, shipped, etc., with the dry blend being added to water by the user at a low pH level. After dissolution of the product in the aqueous medium, cross-linkage of the product may be obtained by raising the pH in the manner specified above. Such a dry blend of cellulose sulfate and the tetravalent metal salt may be attractive to many users since the use of the dry blend would eliminate any necessity for weighing the two products and preparing two solutions in the field, etc.

While not being bound by any theory, it is believed that the cross-linking of the cellulose sulfate by a tetravalent metal ion involves chelate formation. In the formation of the postulated chelate, it is believed that the sulfate ester groups are involved via ionic bonding, while the hydroxyl groups are involved via the formation of coordinate bonds with both types of bonds being connected to the tetravalent metal atom. This structure is indicated by the fact that polyols such as dextrose, sorbitol, etc., may reduce the degree of cross-linkage to some extent if present at a relatively high concentration and that the lower D.S. cellulose sulfate appears to cross-link to a higher degree. Other ions, such as $NH_4^+$, $Ca^{++}$, $Al^{+++}$, etc., may also become a part of the cross-linking complex since it has been found that the presence of a relatively high concentration of salts containing such other ions also exerts a noticeable influence on the viscosity change and the gel formation produced by the soluble tetravalent metal salts. This postulated mechanism also explains the fact that the pH threshold value at which and above which cross-linkage occurs may vary over a relatively wide range, depending upon the specific conditions present, such as the type of tetravalent metal salt, the type of other salts in solution, and the concentrations of the various ingredients.

Whatever the cross-linking mechanism may be, it has been found that no cross-linking can be induced without the participation of a tetravalent metal salt. Thus, whatever the exact structure of the cross-linking complex may be it must contain a tetravalent metal atom as the principal constituent.

To further illustrate the invention, reference is made to the following examples, in which all parts and percentages are by weight, unless otherwise indicated.

EXAMPLE I

Cotton linter pulp (400 grams) having a moisture content of about 6% was mixed with 3.5 liters of dimethylformamide (DMF) in a jacketed double sigma blade type mixer to thoroughly and completely wet the cellulose with the solvent. The cotton linter pulp used was Buckeye Cellulose ER-4500. This material has an average degree of polymerization (D.P.) of approximately 5,860 and is obtained from cotton linters. At the present time, there is no commercially-available cellulose having a D.P. higher than that of the Buckeye Cellulose ER-4500 as supplied by Buckeye Cellulose Corporation, Memphis, Tennessee. After thoroughly wetting the cellulose with the DMF solvent, 600 grams of $N_2O_4$ were added to the mixer over a period of about 30 to 45 minutes while cooling to maintain the temperature below about 30° C. When the nitrosation reaction was completed, dimethylformamidesulfur trioxide complex containing about 200 grams of $SO_3$ was added in the form of a slurry in DMF over a period of about 30–45 minutes with agitation and cooling to maintain the temperature below 25°–30° C., and preferably below 15°–20° C. After completion of the sulfation reaction, about 500 milliliters of water were added slowly to remove residual nitrite groups and the mixture was then neutralized with a solution or a slurry of sodium carbonate in water or in aqueous methanol. The neutralization with sodium carbonate is preferably carried out to a pH of only about 4–5 with the neutralization then being finished to a pH of 7–8 through the addition of a solution of sodium hydroxide so as to avoid the presence of bicarbonate or carbonate ions in the final product. The temperature of the reaction mixture was preferably maintained below about 20° C. throughout the reaction until neutralization was complete, and up to the neutralization step, the reaction was preferably carried out under exclusion of moisture. The neutral mixture was then pressed out or centrifuged and if the solids were too soft to be pressed out, some methanol was added to harden them sufficiently. The solids were suspended in about 60–70% aqueous methanol, pressed out again, dried, and milled. For higher purity, the solids were suspended in aqueous methanol a second, and, if necessary, a third time, before the final drying and milling. The degree of substitution (D.S.) of the sodium cellulose sulfate product was about 0.9. To produce sodium cellulose sulfate products having either lower or higher D.S.'s, the amount of the sulfating reagent may be changed to provide the theoretical amount of the sulfur trioxide required to produce the desired lower or higher D.S. in the sodium cellulose sulfate. As described previously, if the desired D.S. of the sodium cellulose sulfate is in excess of 1.1, the degree of nitrosation of the cellulose nitrite intermediate is preferably less than 2. Also, as the D.S. of the sodium sulfate is increased above about 1.1, an excess amount of sulfating reagent is required for sulfation which exceeds the theoretical amount as calculated from the D.S. that is desired in the sodium cellulose sulfate.

EXAMPLE II

One gram of sodium cellulose sulfate having a D.S. of 0.5 and prepared from cotton linter pulp in the manner described in Example I was dissolved in 200 milliliters of water to form a cellulose sulfate solution. Ten grams of calcium chloride were then dissolved in the cellulose sulfate solution, and to this were added 2 milliliters of a 10% solution of zirconium oxychloride with agitation. At this point, the pH of the mixture was below 4 and the viscosity was 360 cps at 60 rpm and 540 cps at 6 rpm as measured with a Brookfield Viscometer Model LVT, at 20° C. Dilute ammonium hydroxide was then added with agitation until the pH was raised to about 7. This produced a significant increase in both the viscosity and pseudoplasticity of the mixture. At this point, the viscosity was 1160 cps at 60 rpm and 4400 cps at 6 rpm. It was observed that the viscosity of the mixture began to increase when the pH was about 4 to 5.

Example II was repeated using the same conditions specified, but using 40 grams of calcium chloride instead of 10 grams. The viscosity prior to cross-linking of the cellulose sulfate was 302 cps at 60 rpm and 450 cps at 6 rpm. After cross-linking occurred, the viscosity was 1800 cps at 60 rpm and 8800 cps at 6 rpm. When sodium chloride was employed in lieu of the calcium chloride, in the concentrations specified above, similar results were obtained. When the quantity of zirconium oxychloride was increased 1.5- to 2-fold, i.e., 3 milliliters of 4 milliliters of the 10% zirconium oxychloride solution, the viscosity increase that was obtained upon increase of the pH was substantially higher to provide the solution with a cohesive gel-like consistency. A particularly strong and cohesive gel-like consistency was obtained when the concentration of the cellulose sulfate reactant in the cross-linking reaction was also increased.

EXAMPLE III

When Example II was repeated using sodium cellulose sulfate prepared in the manner described in Example I but having a D.S. of 0.8, rather than 0.5, the viscosity measurements obtained when the solution contained 5% calcium chloride were 380 cps at 60 rpm and 540 cps at 6 rpm prior to cross-linkage of the cellulose sulfate. After cross-linkage occurred by raising the pH, the viscosity was 950 cps at 60 rpm and 3900 cps at 6 rpm. When the example was repeated, using 5% sodium chloride in lieu of calcium chloride, similar results were obtained. However, when a sodium cellulose sulfate reactant was used which had a still higher D.S., in excess of 0.8, the difference between the viscosity before and after cross-linkage of the cellulose sulfate with a tetravalent metal ion was found to be somewhat smaller than with a lower D.S. sodium cellulose sulfate. In most cases, the cross-linked cellulose sulfate solutions appeared to have yield points as indicated by the fact that small air bubbles would not rise through the solution and relatively coarse particles would not settle out of the solution.

EXAMPLE V

To 200 milliliters of a 0.5% aqueous solution of sodium cellulose sulfate prepared according to the procedure of Example I and having a D.S. of about 1.0 were added 1 gram of sodium chloride, 1 gram of sodium acetate, and 3 milliliters of a 5% aqueous solution of ceric ammonium nitrate, $(NH_4)_2Ce(NO_3)_6$, with agitation, with the pH of the solution then being about 6. The pH was then raised to about 9–10 through the addition of dilute potassium hydroxide solution which resulted in a substantial viscosity increase. The Brookfield viscosity was 252 cps at 60 rpm and 425 cps at 6 rpm prior to cross-linkage of the sodium cellulose sulfate. After cross-linkage of the sodium cellulose sulfate, the viscosity was 892 cps at 60 rpm and 3280 cps at 6 rpm. Similar results were obtained when titanium sulfate, $Ti(SO_4)_2$, was used in lieu of ceric ammonium nitrate. However, a portion of the titanium sulfate became insoluble when it was added to water and thus, its efficiency as a cross-linking agent was correspondingly reduced.

Example IV was repeated using 2 grams of cellulose sulfate prepared according to the general procedure of Example I and having a D.S. of about 0.7 dissolved in a solution composed of 130 grams of ammonium nitrate in 70 grams of water. To this solution were added 2 milliliters of a 10% aqueous solution of zirconium oxychloride with strong agitation. The pH of the solution was below 5 and no substantial change occurred during addition of the tetravalent metal salt. The pH was then raised through the addition, with agitation, of dimethylamine to a pH of about 7.6. This produced the formation of a flexible cohesive gel. It appeared that the pH had to exceed about 6–7 in order to obtain the formation of the gel.

EXAMPLE V

A solution was formed by dissolving 0.6 grams of sodium cellulose sulfate prepared according to the general procedure of Example I and having a D.S. of about 0.9 in 150 milliliters of water. To this solution were added 20 grams of calcium chloride, 50 grams of barium sulfate, and 0.6 milliliters of a 10% aqueous solution of zirconium oxychloride with agitation. Sufficient calcium hydroxide was then added with strong agitation to raise the pH of the solution to 9–10. This produced a substantial increase in the viscosity of the solution and no settling of the barium sulfate was noted over a period of several weeks.

When Example V was repeated using sodium cellulose sulfate prepared according to the general procedure of Example I and having a D.S. of about 1.4, instead of a D.S. of 0.9, similar results were obtained.

EXAMPLE VI

A solution was prepared which contained 0.5% sodium cellulose sulfate having a D.S. of 1.3, 7% of calcium chloride, and 0.1% of zirconium oxychloride at a pH of less than 2. The viscosity was about 300 cps at 60 rpm as measured with a Brookfield Viscometer, Model LVT, at 20° C. Two grams of calcium carbonate were then dispersed in the solution, and the mixture was left at room temperature. After about 10 minutes, the pH was found to be 5.5 and the Brookfield viscosity had then increased to about 1500 cps at 60 rpm with the mixture then exhibiting a slightly gelatinous consistency.

When Example VI was repeated, similar results were obtained when the calcium carbonate was replaced by magnesium oxide or magnesium hydroxide or by aluminum hydroxide. Similarly, when 30% of calcium bromide as a salt mixture containing a significant amount of zinc bromide was used instead of the 7% calcium chloride, similar results were obtained. The thickening, i.e., cross-linking of the sodium cellulose sulfate, was obtained under these conditions, using various cellulose sulfates having degrees of substitution of about 0.5, 1.0 and 1.6. However, it was found that the degree of thickening obtained decreased as the D.S. of the sodium cellulose sulfate reactant was increased.

Cellulose sulfates prepared from a cellulose nitrite intermediate, as described previously, become water-insoluble as the D.S. decreases to below about 0.3. Water-soluble cellulose sulfates, as their D.S. is reduced to about the threshold limit of insolubility, become increasingly less compatible with high concentrations of salts. Accordingly, cellulose sulfates having a D.S. that is relatively close to about 0.3 can be satisfactorily cross-linked with tetravalent metal ions, as described, in the absence of other metal salts or in the presence of a relatively low concentration of a mono-, di-, or trivalent metal salt.

EXAMPLE VII

A solution of cellulose sulfate and sodium chloride was prepared in deionized water and a small amount of a 10% aqueous solution of zirconium oxychloride was added with stirring. The pH of the resulting solution was about 2–2.5 and no significant viscosity increase was noted in the solution on the addition of the zirconium oxychloride. The pH was then gradually raised by the addition of dilute ammonium hydroxide with strong agitation. The viscosity was determined at various pH values and the observed results, including the specific conditions employed, are set forth in Tables 1 and 2, which follow. As indicated in Tables 1 and 2, the percentages of sodium chloride and cellulose sulfate are based on the total weight of the solution. However, the percentage of the zirconium oxychloride is based on the weight of sodium cellulose sulfate in solution.

TABLE 1

| (Sodium Cellulose Sulfate, D.S. of 0.8–0.9) | | | |
|---|---|---|---|
| | Viscosity, cps | | Viscosity, cps |
| pH | Conditions: 20% NaCl, 0.5% NaCel . SO$_4$, 5% ZrOCl$_2$ | pH | Conditions: 5% NaCl, 0.5% NaCelSO$_4$, 5% ZrOCl$_2$ |
| 2.1 | 414 | 2.5 | 406 |
| 2.9 | 488 | 3.6 | 880 |
| 3.4 | 620 | 5.1 | 1200 |
| 4.8 | 1740 | 7.7 | 1000 |
| 7.7 | 1700 | 9.3 | 1020 |

TABLE 2

| (Sodium Cellulose Sulfate, D.S. of 1.4–1.5) | | | |
|---|---|---|---|
| | Viscosity, cps | | Viscosity, cps |
| pH | Conditions: 20% NaCl, 0.5% NaCel . SO$_4$, 5% ZrOCl$_2$ | pH | Conditions: 20% NaCl, 1% NaCel . SO$_4$, 10% ZrOCl$_2$ |
| 2.5 | 70 | 2.3 | 600 |
| 4.3 | 100 | 3.0 | 1092 |
| 6.8 | 80 | 3.9 | 1240 |
| 7.5 | 80 | 5.2 | 1088 |
| | | 5.4 | 1130 |
| | | 6.5 | 900 |

When the experiments reported above in Tables 1 and 2 were repeated using potassium cellulose sulfate, magnesium cellulose sulfate, or mixed sodium-calcium cellulose sulfate, similar results were obtained.

As stated previously, the presence of other salts, in addition to the substantially water-soluble salt of a tetravalent metal ion, is advantageous in the formation of a thickened aqueous medium through a cross-linking reaction of tetravalent metal ions with the cellulose sulfate ester. The salt which may be present in addition to the salt of a tetravalent metal ion is substantially water-soluble and may be present in any amount up to the saturation level of the salt. As examples of suitable salts, the salt may be ammonium sulfate, sodium chloride, potassium chloride, magnesium chloride, calcium chloride, strontium chloride, aluminum sulfate, zinc sulfate, nickelous sulfate, cobaltous sulfate, cupric sulfate, cadmium chloride, ferrous sulfate, chromic chloride, lead acetate, mercuric acetate, silver nitrate and stannous chloride.

Cellulose sulfate esters having a degree of substitution in excess of about 1.3 are incompatible with barium, cerous, and ferric ions. Thus, these ions should not be present when a cellulose sulfate ester having a degree of substitution in excess of about 1.3 is cross-linked through reaction with a tetravalent metal ion, as described. However, cellulose sulfate esters having a D.S. of about 1.3 and lower are compatible with barium, cerous, and ferric ions. Thus, the presence of these ions in a substantially water-soluble salt in addition to the salt of a tetravalant metal ion, as described, is beneficial when the degree of substitution of the cellulose sulfate is about 1.3 and lower.

An aqueous medium containing a cellulose sulfate ester which is cross-linked with a tetravalent metal ion, as described, may be buffered to a desired pH. The desired pH may vary depending upon the specific make-up of the aqueous medium and whether it is used as a cleaner, a water-base paint, etc. Additionally, the desired pH may vary depending upon the threshold pH at which a particular cellulose sulfate is cross-linked with a tetravalent metal ion. As examples of suitable buffering agents, a mixture of acetic acid and sodium acetate may be used to maintain the pH at a desired level between about 4 and about 8. Also, sodium bicarbonate may be used to buffer an aqueous medium at a desired pH of about 7 to about 8.

In usage, a cellulose sulfate which is cross-linked with a tetravalent metal ion, as described, may be used to provide thickening of an aqueous medium. The quantity of cross-linked cellulose sulfate which is added may be varied depending upon the desired viscosity of the aqueous medium, the molecular weight of the cellulose sulfate, the extent to which the cellulose sulfate is cross-linked with a tetravalent metal ion, and the presence of an additional salt in the aqueous medium, i.e. a salt other than a substantially water-soluble salt of a tetravalent ion. Depending upon these factors, the quantity of cross-linked cellulose sulfate may vary, for example, from about 0.5 percent to as high as about 10 percent by weight. The viscosity of the aqueous medium may vary from a relatively low viscosity, such as 5 to 10 cps, up to a very high viscosity, such as about 50,000 cps. At a high viscosity, the aqueous medium may have the consistency of a paste and have a gel-like matrix, as described.

Aqueous compositions containing a cellulose sulfate which is cross-linked with a tetravalent metal ion may exhibit a yield point. Yield point is a well-known technical term and a yield point exists when, in measuring the rheological behavior of a polymer solution, the shear stress fails to return to zero when the shear rate is reduced to zero.

As indicated, the cross-linked cellulose sulfate products of the invention may be used in various applications. For example, the cross-linked cellulose sulfate products may be used to control the viscosity of a drilling fluid such as a drilling mud. The pseudoplastic viscosity characteristics of the cross-linked cellulose sulfate products are quite advantageous in a drilling mud. When the drilling mud is sheared and is undergoing circulation, the visocity of the drilling mud is reduced, which permits pumping of the drilling mud into the well bore to lubricate the drill bit and to carry cuttings to the surface. When drilling ceases, and the crilling fluid is at rest, the viscosity of the drilling fluid is increased. This insures that cuttings, etc., which are carried by the drilling fluid will remain in suspension when the drilling fluid is at rest.

As described, the cellulose sulfate that is cross-linked with a tetravalent metal ion in accord with the invention may be produced from various forms of cellulose. Thus, the cellulose may be obtained from cotton linters or from wood pulp. Examples of various types of cellulose are Buckeye ER-4,500 (a D.P. of ~5500–6200), Buckeye I ER-1600), a D.P. of ~3,000–4,000), Buckeye I ARY-500-2 (a D.P. of ~1,000–1,500); Acetanier-P and Rayocord-X-G-LD by ITT Rayonier Inc., New York; Kamloops Kraft by Weyerhaeuser Co., Tacoma, Washington, and Whatman Cellulose Powder Grade CR-II (a D.P. of ~150–200 ).

Still other end uses for the cross-linked cellulose sulfate products of the invention is in gelled explosives, and as absorbents in paper products, such as diapers, towels, etc. The cross-linked cellulose sulfate products of the invention may also be used in emulsion stabilization as well as in suspension stabilization. Other use applications are in cosmetics, pharmaceuticals, water-base paints, various paper products, textile manufacturing, photography, etc.

What is claimed is:

1. A method of forming a cross-linked cellulose sulfate ester, said method comprising:
   reacting a cellulose sulfate ester in an aqueous medium with a substantially water-soluble salt of a tetravalent metal, and
   said reaction being carried out at a pH level that is as high or higher than the threshold pH level at which the cellulose sulfate ester is cross-linked by the tetravalent metal ion of said substantially water-soluble salt.

2. The method of claim 1 wherein
   said cellulose sulfate ester has a degree of substitution of about 0.3 to 2.0.

3. The method of claim 1 wherein
   the reaction is carried out in the presence of an additional water-soluble salt which is not a salt of a tetravalent metal ion and is compatible with said cellulose sulfate esters.

4. The method of claim 2 wherein
   the cellulose sulfate ester is prepared from a cellulose nitrite intermediate.

5. The method of claim 1 including
   admixing the cellulose sulfate and the salt of the tetravalent metal at a pH below said threshold pH level, and increasing the pH up to at least said threshold pH level to provide reaction between said cellulose sulfate ester and the tetravalent metal of said substantially water-soluble salt.

6. The method of claim 5 wherein
the cellulose sulfate ester has a degree of substitution of about 0.3 to 2.0, and
the cellulose sulfate ester is prepared from a cellulose nitrite intermediate.

7. The method of claim 3 wherein the cellulose sulfate ester has a degree of substitution of about 1.3 or less.

8. The method of claim 3 wherein the cellulose sulfate ester has a degree of substitution in excess of about 1.3 and the additional salt is not a barium, ferric, or cerous salt.

9. The method of claim 1 including
separating the cross-linked cellulose sulfate ester from the aqueous medium after completion of the cross-linking reaction.

10. The method of claim 6 including
separating the cross-linked cellulose sulfate ester from the aqueous medium after completion of the cross-linking reaction.

11. The method of claim 1 wherein
said salt of a tetravalent metal is employed in an amount of about 1 to about 30 percent by weight of the cellulose sulfate ester.

12. The method of claim 1 including
buffering said aqueous medium to maintain the pH of the medium at a desired level.

13. A cross-linked cellulose sulfate ester in which the cross-linking bonds include a tetravalent metal.

14. The cross-linked cellulose sulfate of claim 13 wherein the cellulose sulfate has a degree of substitution of about 0.3 to 2.0 with the cellulose sulfate being obtained from a cellulose nitrite intermediate.

15. The cross-linked cellulose sulfate of claim 14 wherein the tetravalent metal is zirconium.

16. The cross-linked cellulose sulfate of claim 14 wherein the tetravalent metal is cerium.

17. The cross-linked cellulose sulfate of claim 14 wherein the tetravalent metal is titanium.

18. A composition comprising cellulose sulfate in admixture with a substantially water-soluble salt of a tetravalent metal, with said salt being present in an amount sufficient to produce a viscosity increase in an aqueous medium containing the cellulose sulfate and the salt when the pH of the aqueous medium is at or above the threshold pH at which ions of said tetravalent metal produce cross-linking of said cellulose sulfate.

19. The composition of claim 18 wherein the cellulose sulfate has a degree of substitution of about 0.3 to 2.0 with the cellulose sulfate being produced from a cellulose nitrite intermediate.

20. The composition of claim 19 wherein
the substantially water-soluble salt of a tetravalent metal is present in an amount of about 1 to about 30 percent by weight of the cellulose sulfate.

21. The composition of claim 19 wherein the substantially water-soluble salt of a tetravalent metal is present in an amount of about 4 to about 20 percent by weight of the cellulose sulfate.

22. The composition of claim 19 wherein the tetravalent metal in said salt is cerium.

23. The composition of claim 19 wherein the tetravalent metal in said salt is zirconium.

24. The composition of claim 19 wherein the tetravalent metal in said salt is titanium.

25. A thickened aqueous medium containing a cross-linked cellulose sulfate ester in which the cross-linking bonds include a tetravalent metal with said cross-linked cellulose sulfate being present in an amount sufficient to thicken the aqueous medium.

26. The thickened aqueous medium of claim 25 wherein the cross-linked cellulose sulfate is present in an amount of about 0.05 to about 10 percent by weight.

27. The thickened aqueous medium of claim 25 including
a buffering agent to maintain the pH of the aqueous medium at a desired level.

28. The thickened aqueous medium of claim 25 including
a substantially water-soluble salt other than a salt of a tetravalent metal.

* * * * *